(12) United States Patent
Lin et al.

(10) Patent No.: US 6,574,050 B1
(45) Date of Patent: Jun. 3, 2003

(54) 3D SHAPE-MEASURING APPARATUS USING BIAXIAL ANAMORPHIC MAGNIFICATION

(75) Inventors: Ming-Hui Lin, Hsin-Chu (TW); Tung-Fa Liou, Hsin-Chu (TW)

(73) Assignee: Industrial Technology Research Institute, Hsin-Chu Hsien (TW)

( * ) Notice: Subject to any disclaimer, the term of this patent is extended or adjusted under 35 U.S.C. 154(b) by 5 days.

(21) Appl. No.: 10/126,582

(22) Filed: Apr. 22, 2002

(30) Foreign Application Priority Data

Dec. 7, 2001 (TW) ........................................ 90130271 A

(51) Int. Cl.[7] .......................... G02B 13/08; G01B 11/24
(52) U.S. Cl. ...................... 359/668; 359/710; 359/662; 356/601; 356/602; 356/607; 356/608
(58) Field of Search ................................ 359/662, 710, 359/668; 356/601, 602, 607, 608

(56) References Cited

U.S. PATENT DOCUMENTS

| | | | | |
|---|---|---|---|---|
| 5,218,427 A | * | 6/1993 | Koch | 356/376 |
| 5,870,220 A | * | 2/1999 | Migdal et al. | 359/216 |
| 6,181,424 B1 | * | 1/2001 | Okabayashi et al. | 356/376 |
| 6,426,840 B1 | * | 7/2002 | Partanen et al. | 359/668 |

* cited by examiner

*Primary Examiner*—Georgia Epps
*Assistant Examiner*—M. Hasan

(57) ABSTRACT

A 3D shape-measuring apparatus using biaxial anamorphic magnification comprises a light source that projects a light onto an object surface to be sensed. Via an electrical image-grabbing device, such as CCD camera, the light reflected from the object is grabbed to determine the coordinate locations sensed on the object. Before the electrical image-grabbing device, the light reflected from the object passes respectively through a curved reflecting mirror or an assembly of telecentric cylindrical lenses to adjust an image magnification along the light projection direction, and an assembly of cylindrical lenses to adjust an image magnification along a direction perpendicular to the light projection direction. Thereby, resolution nonuniformity with respect to near and far distance is resolved while the observable range of the CCD camera can further be efficiently changed into a measurable field.

11 Claims, 6 Drawing Sheets

3D SHAPE-MEASURING APPARATUS USING BIAXIAL ANAMORPHIC MAGNIFICATION

FIELD OF THE INVENTION

The invention relates to a 3D shape-measuring apparatus using biaxial anamorphic magnification that, more particularly, uses telecentric property to uniformize resolution ranging from near distance to far distance.

BACKGROUND OF THE INVENTION

An image-grabbing device for 3D shape-measuring apparatus conventionally comprises a camera lens with fixed focal length associated with a charge coupled device (CCD) camera having fixed resolutions and a fixed size, the CCD camera having fixed viewing angle along the vertical direction and the horizontal direction. Thus, if the object distance is increasingly decreased, the observable field is increasingly reduced while the resolution is increased. On the contrary, if the object distance is increased, the observable field is increased while the resolution is decreased. When the optical axis of CCD camera is oblique with the light projection direction, the resolution along the light projection direction is adversely decreased. This resolution is all the more decreased as the light source distance is increased.

To increase the resolution along the light projection direction, the U.S. Pat. No. 6,046,812 uses an anisotropic magnification cylindrical lens to magnify the image along the light projection direction, which thereby increases the resolution there along. Meanwhile, the image magnification along the perpendicular direction is not changed. To achieve the same results as disclosed above, an assembly of prisms may be also used to obtain anisotropic magnification, as disclosed in the U.S. Pat. No. 4,872,747.

Therefore, the conventionally known methods can increase the resolution along the light projection direction. However, those methods fail to remedy a decrease of the resolution along the light projection direction as the light source distance is increased. This resolution nonuniformity occurs when a near distance resolution is sufficient while a far distance resolution is not sufficient. In the conventional technology, the parameters of the CCD camera further usually determine the resolution along a direction perpendicular to the light projection direction. Therefore, the choice of focal length and object distance has already decided the resolution along the perpendicular direction. If one desires to change the resolution along the perpendicular direction, either the focal length or object distance only can be changed. However, conventional 3D shape-measuring apparatus have their preferable object distance of operation, and the adjustment range of the object distance is therefore relatively limited. As a result, changing the focal length is thus usually implemented. Regardless a change of either the object distance or focal length, the resolution along the light projection direction would accordingly change, therefore, the parameters of an assembly of anisotropic or anamorphic lenses should be modified. Generally, the focal length of an objective lens directly determines the resolution in either direction. For cost considerations, most objective lenses are standard with fixed focal length such as CCTV lenses. Therefore from a design consideration, simultaneously fulfilling the requirements of biaxial resolutions is a difficult task.

FIG. 1 is a schematic view that illustrates the resolution of a conventional method without anamorphic magnification. In FIG. 1, a light projection plane 11 is projected onto a surface of an object 20 to be sensed, meanwhile the configuration of the light 7 reflected from the object 20 toward the CCD camera to be grabbed via equally spaced CCD pixels thereof is also shown. As shown in FIG. 1, without anamorphic magnification, the CCD camera has a substantially large angle of view of the light projection direction. However, a far distance resolution dramatically drops. Moreover, because the depth of field of conventional objective lenses is substantially limited, the measuring precision in the area of far distance is therefore substantially affected.

FIG. 2 is a schematic view that illustrates the use of a cylindrical lens for a resolution improvement as disclosed in the U.S. Pat. No. 6,046,812. In FIG. 2, a light projection plane 11 is projected onto a surface of an object 20 to be sensed, meanwhile the configuration of the light 7 reflected from the object 20 toward the CCD camera to be grabbed via equally spaced CCD pixels thereof is also shown. As shown in FIG. 2, the use of a cylindrical lens reduces the angle of view of the light projection direction, which increases its resolution. However, far distance resolution is still adversely lower than near distance resolution.

SUMMARY OF THE INVENTION

It is therefore a principal object of the invention to provide a 3D shape-measuring apparatus using biaxial anamorphic magnification that can anamorphically magnify an image whatever perpendicular to or parallel with a light projection direction. As a result, uniform resolutions along parallel and perpendicular directions with respect to the light projection direction are obtained for 3D measurement while the resolutions further do not decrease as the distance of the light source increases.

To accomplish the above and other objectives, the invention provides a 3D shape-measuring apparatus using biaxial anamorphic magnification that comprises the following elements. A light source projects a light plane or a light ray on a surface of an object to be sensed. The projected light intersects the surface of the object into a light intersection that can be a curve or a point that is reflected toward a curved reflecting mirror (an assembly of telecentric cylindrical lenses is also suitable). After reflecting on the curved reflecting mirror, the reflected light travels through an assembly of first cylindrical lenses into an electrical image-grabbing device (CCD camera) to form an image onto an image sensor, such as a charge coupled device, therein. Thereby, the coordinates of the points hit by the light from the light source, which can be a laser, are calculated. In the invention, either the curved reflecting mirror or the assembly of telecentric cylindrical lenses can adjust the magnification of an image along the light projection direction. The curved reflecting mirror can be a concave mirror with a continuous curvature that reflects the light reflected from the object. The assembly of telecentric cylindrical lenses comprises an assembly of second cylindrical lenses and a planar reflecting mirror that reduce the angle of view of the light projection direction. The focal location of the assembly of telecentric cylindrical lenses further approaches the principal plane of objective lenses. The assembly of first cylindrical lenses adjusts an image magnification along a direction perpendicular to the light projection. Finally, the image is formed on the image sensor (such as a charge coupled device) of the electrical image-grabbing device.

With the invention as described above, under an optical design of anamorphic magnification, a certain level of quality of image formation can be maintained while increasing the resolutions. The observable range of the CCD camera thus can be efficiently changed into a measurable field.

BRIEF DESCRIPTION OF THE DRAWINGS

The drawings included herein provide a further understanding of the invention and, incorporated herein, constitute a part of the invention disclosure. A brief introduction of the drawings is as follows.

DESCRIPTION OF THE PREFERRED EMBODIMENTS

Figure 1:
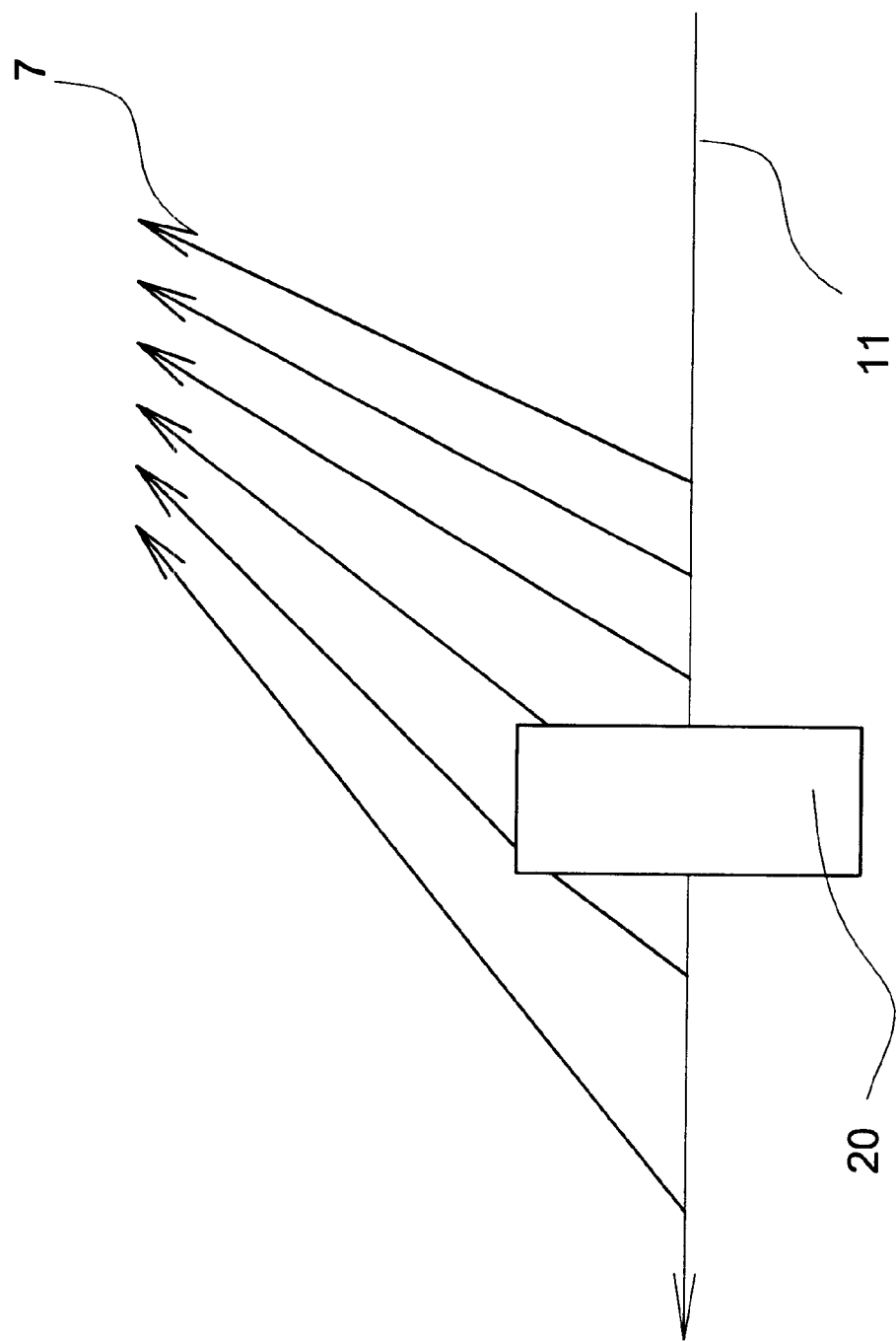
FIG. 1 illustrates a resolution conventionally obtained without anamorphic magnification.

Wherever possible in the following description, similar reference numerals and symbols will refer to similar elements unless otherwise illustrated.

Figure 2:
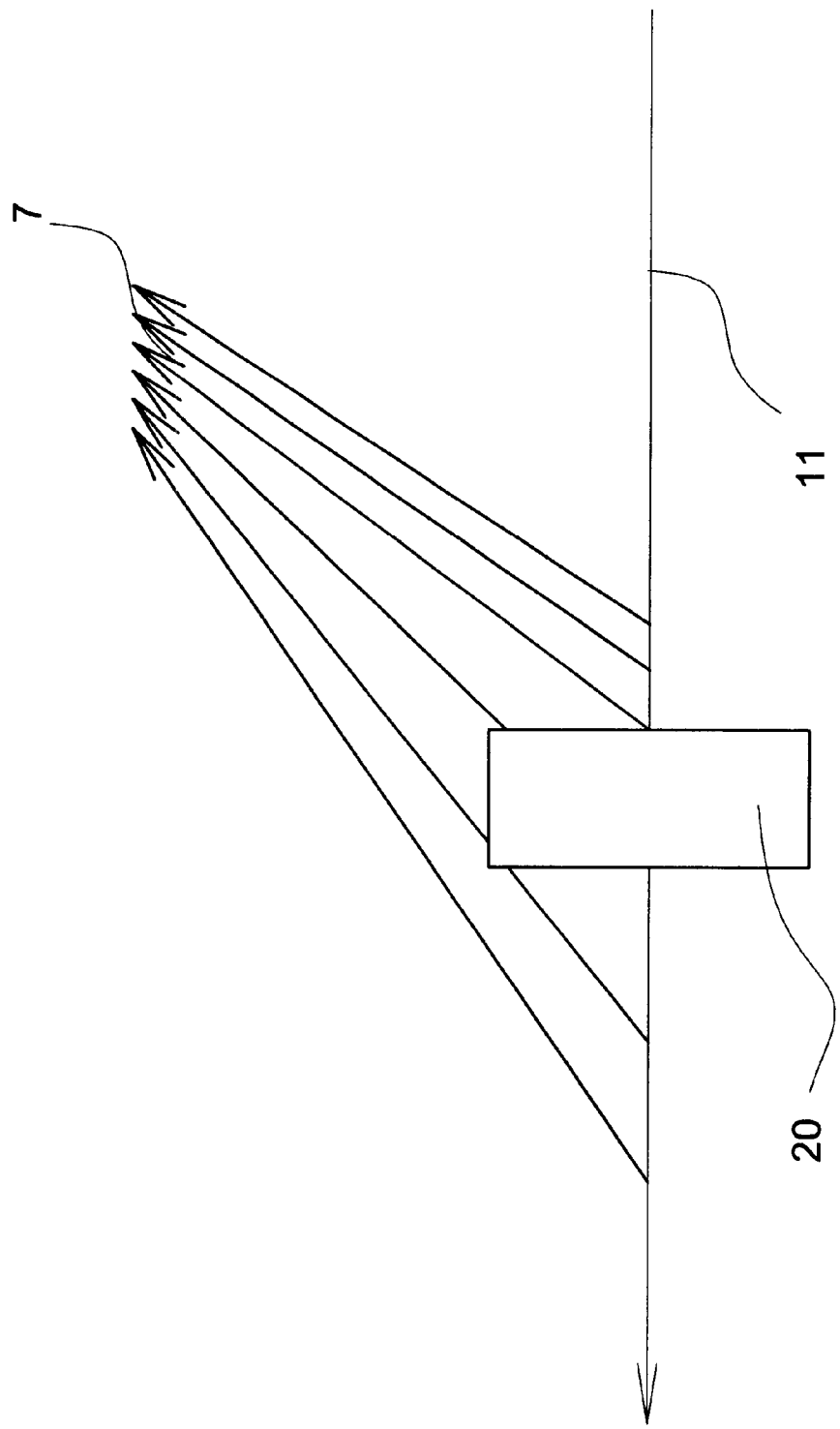
FIG. 2 illustrates a conventional use of a cylindrical lens to improve the resolution.
Figure 3:
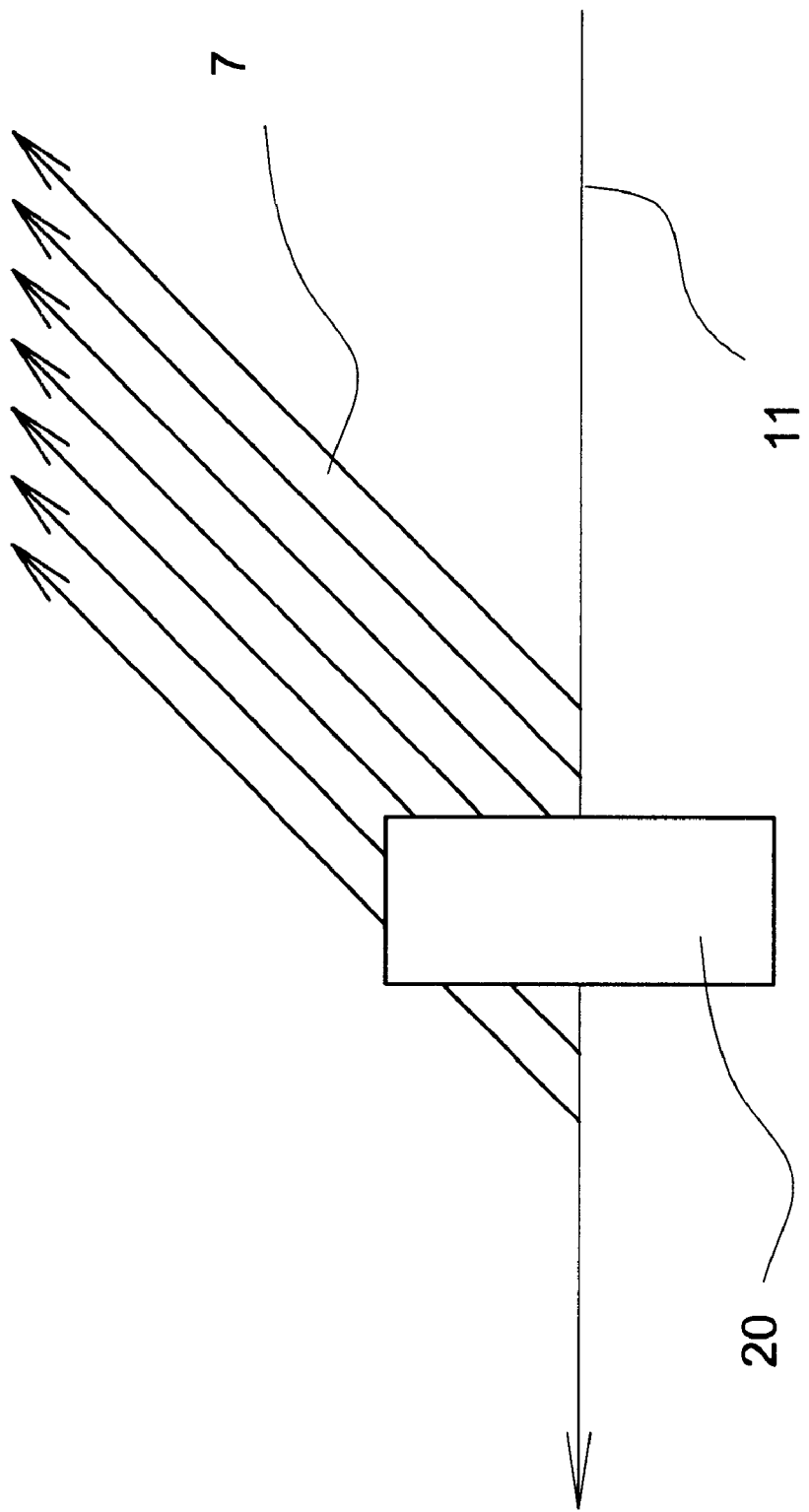
FIG. 3 illustrates the resolution principle of the invention.

The invention provides a 3D shape-measuring apparatus using biaxial anamorphic magnification that is an image-grabbing device arranged in a manner to sense the location of a light intersection on a surface of an object caused by a light projected thereon from a light source. According to one specific feature of the invention, the image-grabbing device of the invention specifically has high and uniform resolutions. FIG. 3 illustrates the resolution principle of the invention in which one element is the use of a curved reflecting mirror to reduce the angle of view of the light projection direction and, furthermore, uniformize near and far distance resolutions. In comparison with the conventional structure as shown in FIG. 1 and FIG. 2, the invention enables the resolution of the reflected light 7 grabbed by the electrical image-grabbing device 60 to be uniform. As a result, resolution nonuniformity with respect to near and far distances is therefore resolved in the invention. A detailed description of embodiments and examples of the invention now is made with reference to FIG. 4 through FIG. 6.

[First Embodiment]

To resolve the problem of directional resolution nonuniformity with respect to a light projection in near and far distance, the invention provides a 3D shape-measuring apparatus using biaxial anamorphic magnification that uses telecentric property to uniformize near and far distance resolutions.

Figure 4:
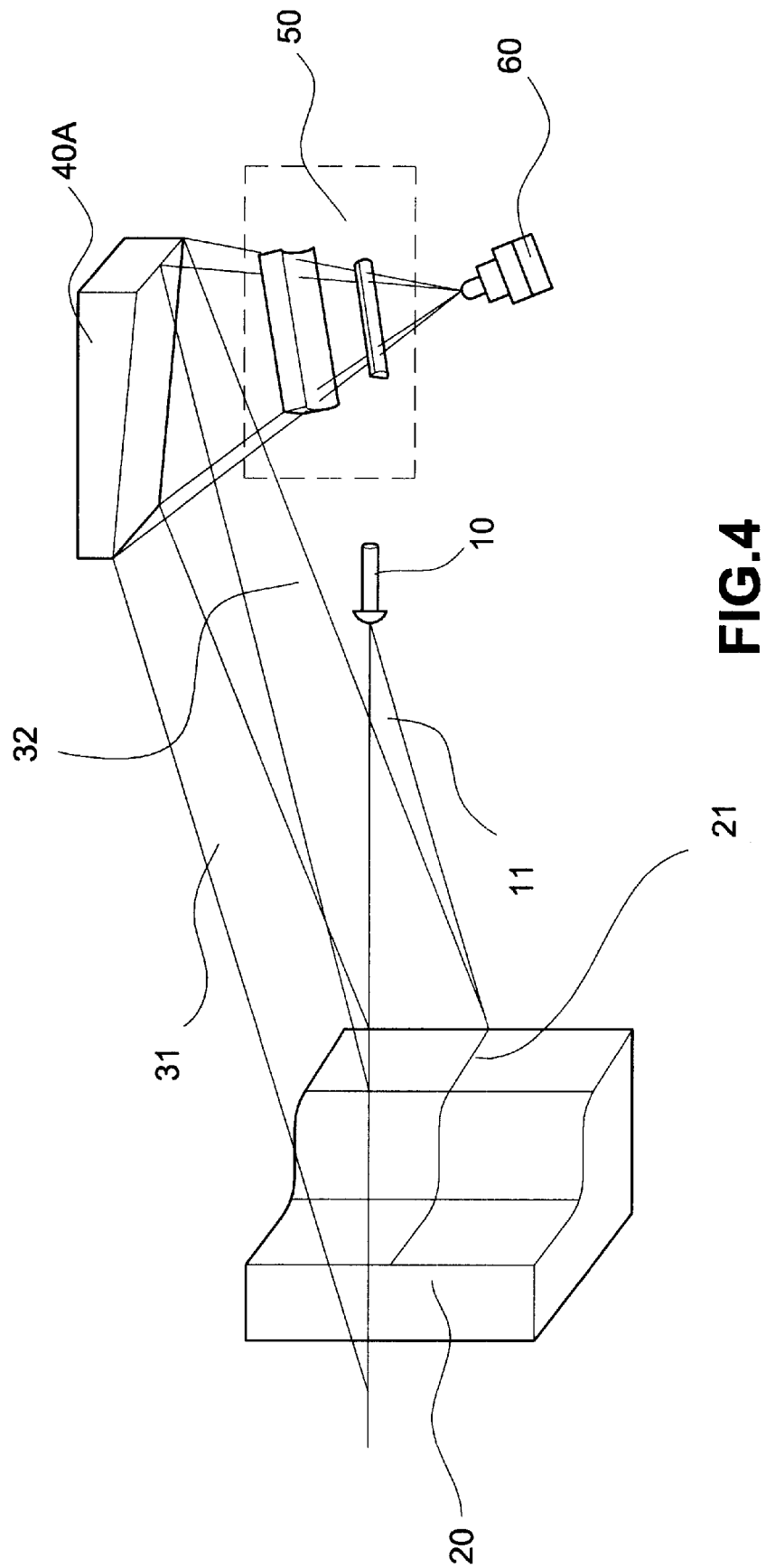
FIG. 4 and FIG. 5 illustrate a 3D shape-measuring apparatus according to a first embodiment of the invention.

Referring to FIG. 4, a schematic view illustrates a shape-measuring apparatus according to a first embodiment of the invention. As shown in FIG. 4, the shape-measuring apparatus comprises a light source 10 that projects an incident light plane (or light ray) onto a surface of an object 20. The 3D coordinates of a light intersection 21 of the incident light on the surface of the object 20 (which can be a curve or a point) can be calculated via a triangulation method. The light intersection 21, reflected from the object 20, then is reflected through a curved reflecting mirror 40A, travels through an assembly of cylindrical lenses 50, to be finally inputted into an electrical image-grabbing device 60 for image formation. The electrical image-grabbing device 60 (CCD camera) principally comprises an objective lenses 61 with fixed focal length, an image sensor (for example, a charge coupled device 62) and the driver circuit thereof. An optical filter may be additionally mounted before the objective lenses 61 to filter specific wavelength of the light ray. According to the size of the charge coupled device 62 and the focal length of the objective lenses 61, the horizontal and vertical angles of view of the electrical image-grabbing device 60 can be determined. The directions included in the horizontal angle of view in the light plane are perpendicular to the direction of light projection, and the directions included in the vertical angle of view in the light plane are the directions of light projection. Hence, the horizontal angle of view is changed through the cylindrical lenses 50 while the vertical angle of view is changed through the curved reflecting mirror 40A. An upper limit plane 31 and a lower limit plane 32 represent the upper and lower limits of the vertical angle of view.

Figure 5:
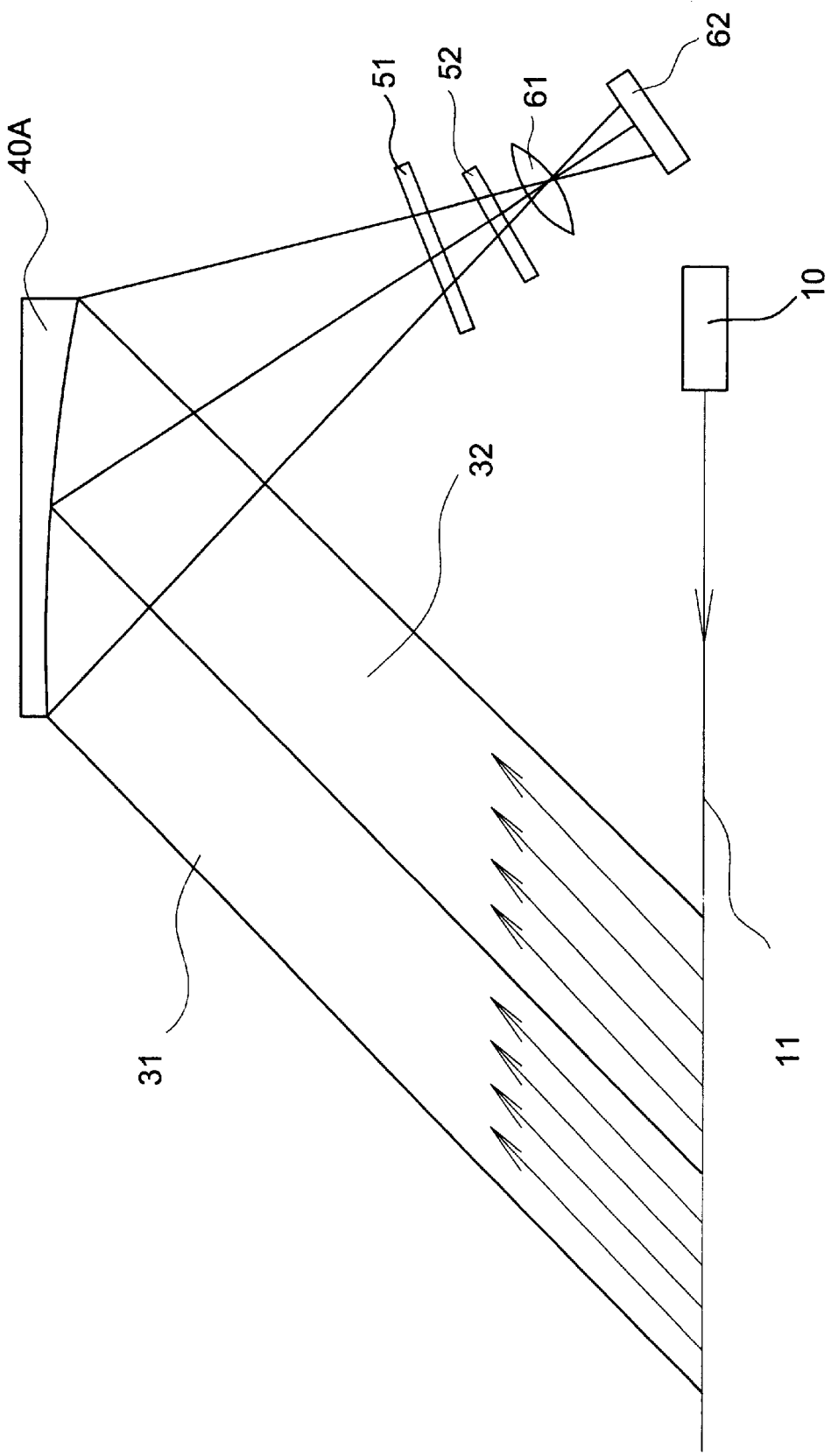

As shown in FIG. 5, according to the geometrical relationship between the location of the curved reflecting mirror 40A and the electrical image-grabbing device 60, the curvature of the surface of the curved reflecting mirror 40A is continuous to approximately form a telecentric structure. In other words, each portion of the curved surface of the reflecting mirror 40A has a focal length that is close to the distance between the said portion of the curved surface and the electrical image-grabbing device 60. The purpose is to obtain reflection planes between the upper and lower limit planes 31, 32 of the vertical angle of view that are approximately parallel and, furthermore, vis-a-vis each pixel along a vertical direction arrayed by the charge coupled device 62, can maintain an equal spacing distance along the direction of light projection in the light projection plane 11. Hence, in comparison with conventional structures without reflecting mirror or with only a planar reflecting mirror, the angle of view along the direction of light projection can be compressed, and the resolution there along is thereby enhanced. Moreover, because the continuous curvature of the curved reflecting mirror 40A enables to obtain a telecentric property, the resolution along the direction of light projection does not decrease along with increasing the light source distance. As a result, the resolution obtained is favorably uniform. In order to improve the quality of image formation, the image formation plane (charge coupled device 62, CCD) of the electrical image-grabbing device 60 must be adequately adjusted. The adjustment angle of the image formation plane should vary in accordance with various factors including the included angle between the light projection and the optical axis of the image-grabbing device 60, the curvature and the location of the curved reflecting mirror 40A.

As shown in FIG. 5, the assembly of cylindrical lenses 50 comprises at least a concave cylindrical lens 51 and a convex cylindrical lens 52. The axis of the concave cylindrical lenses 51 and convex cylindrical lenses 52 need not be necessarily perpendicular to the optical axis to the electrical image-grabbing device 60. To obtain a better image formation, an appropriate axis inclination of the concave and convex cylindrical lenses 51, 52 may be accomplished. When the concave cylindrical lens 51 is placed proximate to the object 20 side while the convex cylindrical lens 52 is placed proximate to the electrical image-grabbing device 60 side, the horizontal angle of view obtained is larger and the image is consequently zoomed more. Oppositely, if the placement of both lenses (concave cylindrical lenses 51 and convex cylindrical lenses 52) is interchanged, the horizontal angle of view obtained is decreased and the image is consequently zoomed less. Furthermore, the image magnification can be changed via adjusting the position or parameter variation of the cylindrical lenses.

[Second Embodiment]

Figure 6:
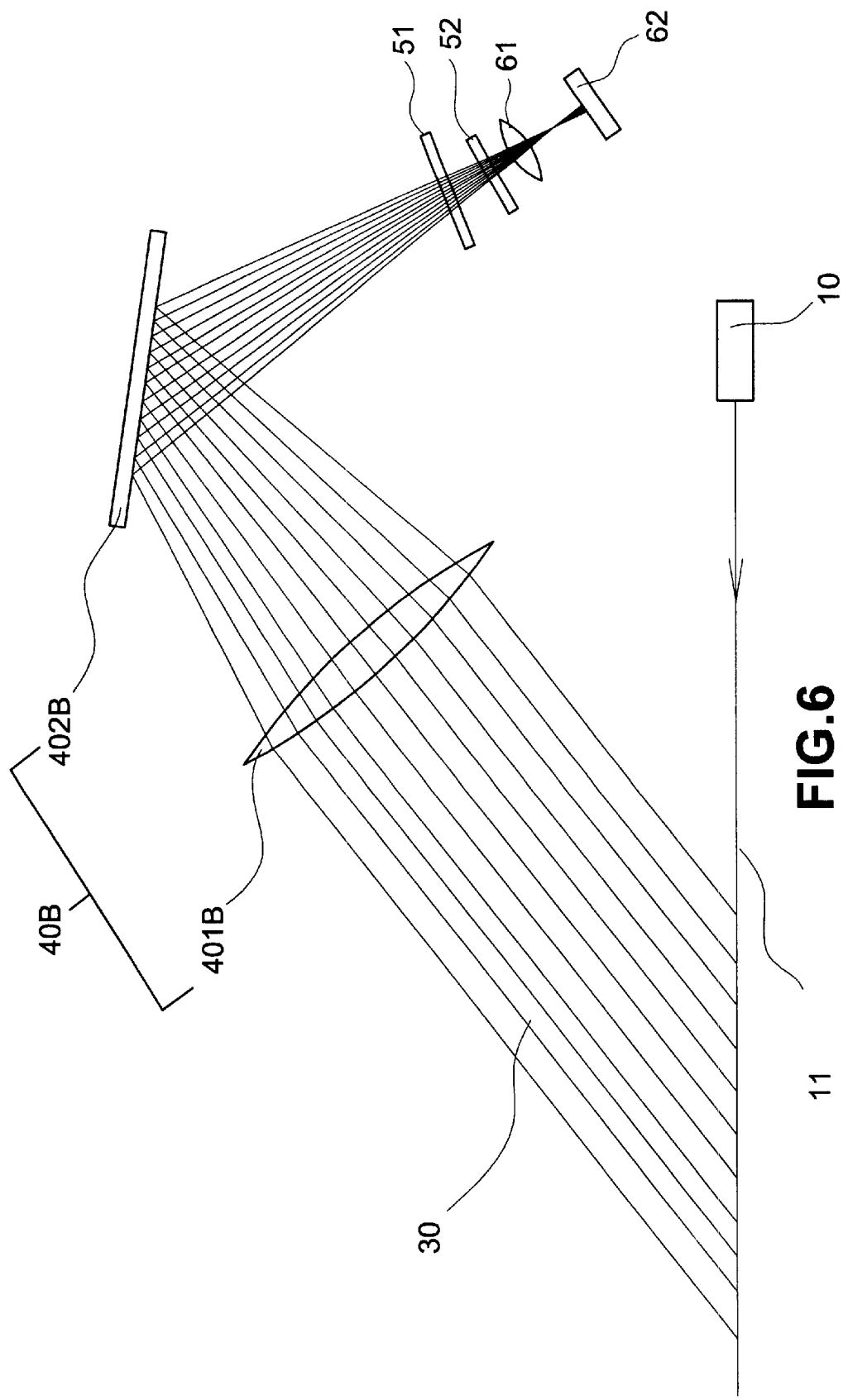
FIG. 6 illustrates a 3D shape-measuring apparatus according to a second embodiment of the invention.

FIG. 6 is a schematic view that illustrates a second embodiment of the invention. As shown in FIG. 6, the curved reflecting mirror 40A is replaced with an assembly of telecentric cylindrical lenses 40B, comprised of a cylindrical lens 401B and a planar reflecting mirror 402B, in the second embodiment. Similar to the first embodiment, the light source 10 projects light in the light projection plane 11 onto the object 20. The light projected intersects a surface of the object 20 into a punctual or curved light intersection. The light intersection, reflected from the object 20 into a light path 30, travels through the cylindrical lens 401B, reflects onto the planar reflecting mirror 402B, and passes through the assembly of cylindrical lenses 50 (concave cylindrical lens 51 and convex cylindrical lens 52) and through the objective lenses 61 (camera lens) to form an image on the charge coupled device 62. To uniformize near and far distance resolutions, the focal length of the cylindrical lens 401B approaches the light distance between the cylindrical lens 401B and the objective lenses 61 and, moreover, the aperture is located on the objective lenses 61. Thereby, a telecentric structure is achieved, and the light paths 30, between the object 20 and the cylindrical lens 401B, to which correspond equal spacing images on the charge coupled device 62, are approximately equally spaced parallel light paths. As illustrated in FIG. 6, the light paths 30 are approximately equally spaced and parallel with one another. As a result, the problem of nonuniformity of near and far distance resolutions is resolved. Compared with the invention, the conventional technology may use an assembly of cylindrical lenses that, however, are located proximate to the camera lens to maintain a measurable range. The result conventionally obtained is therefore only an increase of the resolution without using telecentric property. As a result, the problem of resolution nonuniformity with respect to near and far distances still remains. Via mounting of cylindrical lens 401B and planar reflecting mirror 402B to obtain a telecentric property, the invention favorably improves the problem of resolution nonuniformity with respect to near and far distances. In the invention, the placement of cylindrical lens 401B and planar reflecting mirror 402B may be also advantageously interchanged, and the cylindrical lens 401B may also be an assembly of cylindrical lenses. However, if the cylindrical lens 401B is replaced with an assembly of cylindrical lenses, the assembly of cylindrical lenses must be suitably distant from the objective lenses 61. Furthermore, both assemblies of cylindrical and objective lenses should have sufficient spaces to use telecentric property while maintaining a sufficient observable field.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A 3D shape-measuring apparatus using biaxial anamorphic magnification comprising:

a light source projecting a light plane or a light ray onto a surface of an object to be sensed, the light intersection onto the surface of the object being a curved light intersection or a punctual light intersection;

a curved reflecting mirror having a concave surface of continuous curvature to reflect the light projected from the light source and reflected from the surface of the object, and change an angle of view in the direction of the light projection;

an assembly of cylindrical lenses through which passes the light reflected from the curved reflecting mirror, the assembly of cylindrical lenses adjusting an image magnification along a direction paralleled to the light intersection; and an electrical image-grabbing device comprising a driver circuit, an assembly of objective lenses, and an image sensor, the light after passing through the assembly of cylindrical lenses traveling through the objective lenses to form an image on the image sensor;

wherein the light after being projected from the light source onto the surface of the object, generates a reflected light that further reflects via the curved reflecting mirror, and travels through the assembly of cylindrical lenses into the image-grabbing device. to form an image on the image sensor.

2. The 3D shape-measuring apparatus using biaxial anamorphic magnification of claim 1, wherein the curved reflecting mirror has a monotonously cylindrical reflecting surface.

3. The 3D shape-measuring apparatus using biaxial anamorphic magnification of claim 1, wherein the assembly of cylindrical lenses at least comprises a concave cylindrical lens and a convex cylindrical lens, an image magnification of either increase or decrease respectively depending on the respective focal length and the placement order of the concave and convex cylindrical lenses with respect to the light path.

4. The 3D shape-measuring apparatus using biaxial anamorphic magnification of claim 1, wherein the axis of each cylindrical lens of the assembly of cylindrical lenses is not perpendicular to the axis of the light path to the objective lenses, and forms an adequate included angle therewith to obtain an optimal image formation.

5. The 3D shape-measuring apparatus using biaxial anamorphic magnification of claim 1, wherein an image plane of the image sensor within the electrical image-grabbing device is not perpendicular to the axis of the light path from the objective lenses in order to obtain optimal measuring precision and resolution.

6. The 3D shape-measuring apparatus using biaxial anamorphic magnification of claim 1, further comprising an optical filter placed before the objective lenses within the electrical image-grabbing device to filter at least a specific wavelength of light.

7. A 3D shape-measuring apparatus using biaxial anamorphic magnification comprising:

a light source projecting a light projecting plane or onto a surface of an object to be sensed, the light intersection onto the surface of the object being a curved light intersection or a punctual light intersection;

an assembly of telecentric cylindrical lenses comprising an assembly of second cylindrical lenses and a planar reflecting mirror, wherein the axis of the second cylindrical lenses is perpendicular to the light projection direction and parallel with the light projection plane, an angle of view along the light projection direction being reduced after the light has passed through the assembly of telecentric cylindrical lenses;

an assembly of first cylindrical lenses through which passes a light path from the assembly of telecentric cylindrical lenses, the first cylindrical lenses changing an image magnification along a direction parallel to the light intersection; and an electrical image-grabbing device comprising a driver circuit, an assembly of objective lenses, and an image sensor, wherein the focal point of the second cylindrical lenses approaches the location of the objective lenses, and the light path after the first cylindrical lenses travels through the objective lenses to form an image on the image sensor;

wherein the light after being projected from the light source into an incident light on the surface of the object, generates a reflected light that further travels through the assembly of telecentric cylindrical lenses and the assembly of first cylindrical lenses into the image-grabbing device to form an image on the image sensor.

8. The 3D shape-measuring apparatus using biaxial anamorphic magnification of claim 7, wherein the assembly of first cylindrical lenses at least comprises a concave cylindrical lens and a convex cylindrical lens, an image magnification of either increase or decrease respectively depending on the respective focal length and the placement order of the concave and convex cylindrical lenses with respect to the light path.

9. The 3D shape-measuring apparatus using biaxial anamorphic magnification of claim 7, the axis of each cylindrical lens of the assembly of first cylindrical lenses is not perpendicular to the axis of the light path to the objective lenses, and forms an adequate included angle therewith to obtain an optimal image formation.

10. The 3D shape-measuring apparatus using biaxial anamorphic magnification of claim 7, an image plane of the image sensor within the electrical image-grabbing device is not perpendicular to the axis of the light path from the objective lenses to obtain optimal measuring precision and resolution.

11. The 3D shape-measuring apparatus using biaxial anamorphic magnification of claim 7, further comprising an optical filter placed before the objective lenses within the electrical image-grabbing device to filter at least a specific wavelength of light.

* * * * *